June 18, 1968 W. UFER 3,388,470
POWER KNIFE

Filed April 5, 1966 4 Sheets-Sheet 1

INVENTOR:
WILLY UFER
BY Marvin S. Blodgett
ATTORNEY

June 18, 1968 W. UFER 3,388,470
POWER KNIFE
Filed April 5, 1966 4 Sheets-Sheet 2
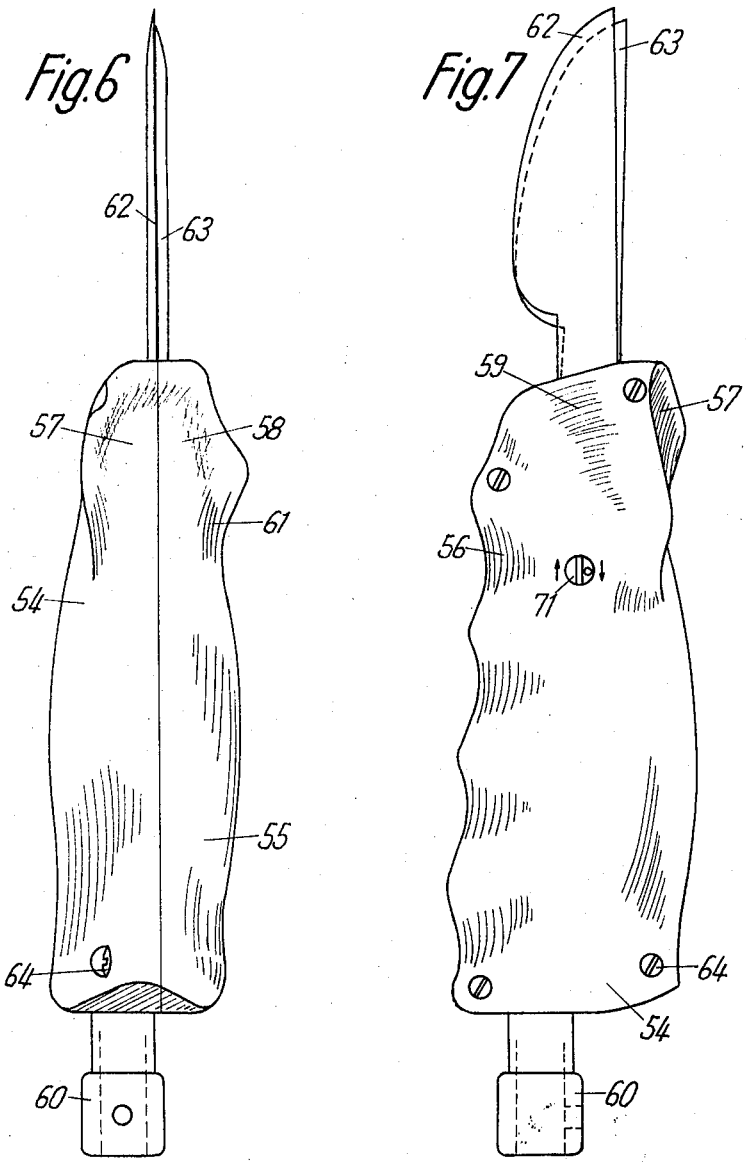
INVENTOR:
WILLY UFER
by Norm S. Blodgett
ATTORNEY

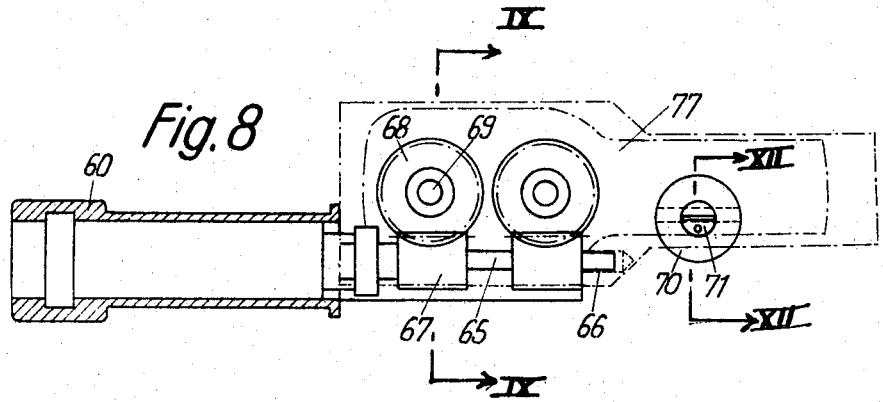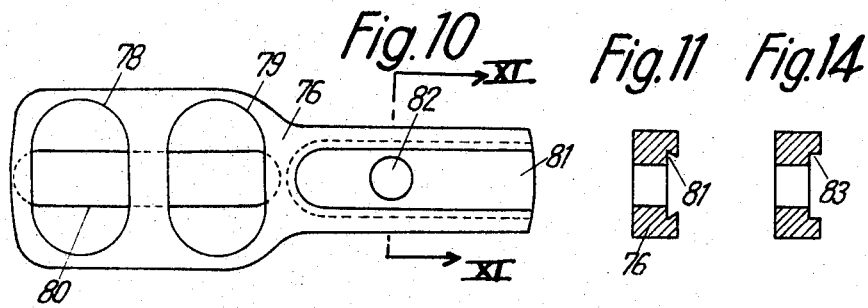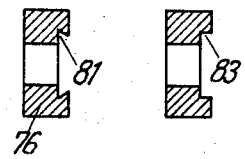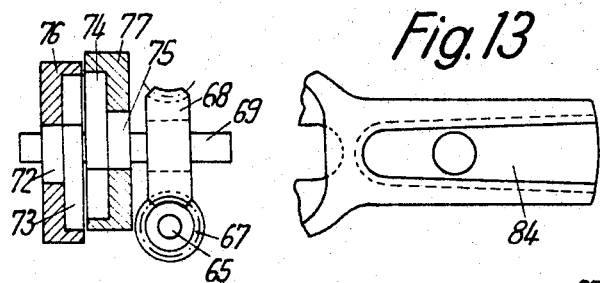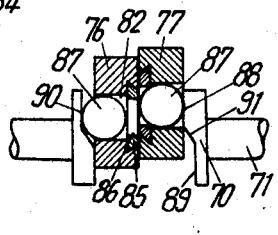

June 18, 1968   W. UFER   3,388,470
POWER KNIFE
Filed April 5, 1966   4 Sheets-Sheet 4
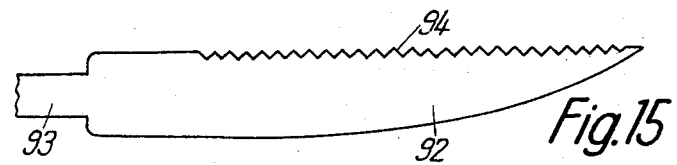
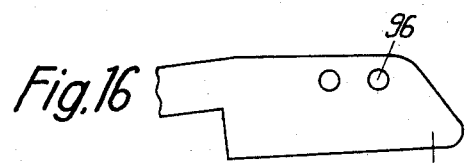
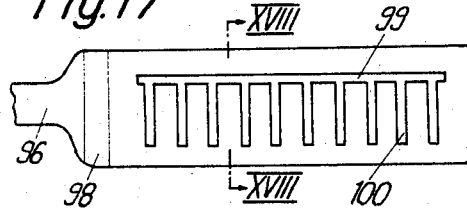 
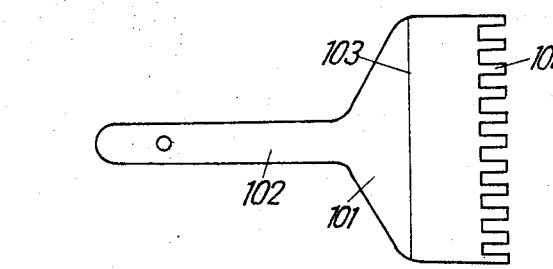
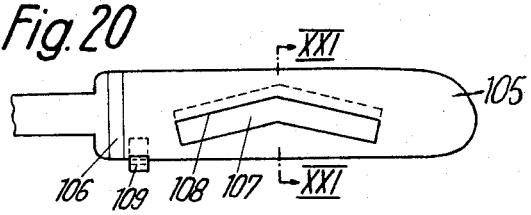 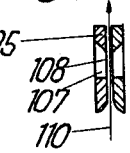
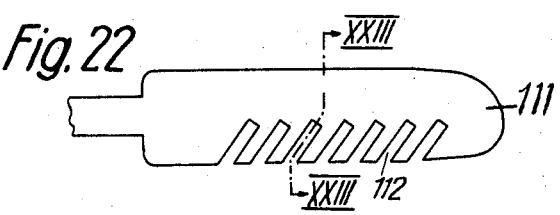 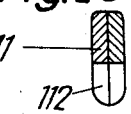
INVENTOR:
WILLY UFER
BY *Norman J. Blodgett*
ATTORNEY United States Patent Office 3,388,470
Patented June 18, 1968

3,388,470
POWER KNIFE
Willy Ufer, 23 Schutzenstrasse, 5903 Geisweid,
Kreis Siegen, Germany
Filed Apr. 5, 1966, Ser. No. 540,225
Claims priority, application Germany, Apr. 7, 1965,
U 11,601; Mar. 8, 1966, U 5,152
1 Claim. (Cl. 30—272)

ABSTRACT OF THE DISCLOSURE

This invention relates to a power knife and, more particularly, to apparatus for the cutting of meats and the like, wherein two cutting blades are arranged in side-by-side relationship and reciprocated in a predetermined fashion.

---

Power-driven cutting devices for cutting meat and separating the meat from the bones have been developed in the past in which a knife blade is moved back and forth like a saw. Another type of power knife of this kind uses a bell-shaped rotating knife which has a cutting edge on its rim and which is partly covered by a protective housing. Rotating knife blades have also been used having movements which are analogous to the movements of the cutting edges of cutting blades. In the past, also, knife blades have been positioned on top of one another and periodically moved lengthwise by an eccentric device. In all of these cases, the ideal operation is not obtained because the cutting efficiency is not high enough; the complete separation of the meat from the bones only becomes possible with these prior art devices after a lengthy working process and the application of considerable effort.

A number of power-driven knives have also been used for skinning. The driving of the blades usually takes place by the use of swash plates or by eccentric devices. The knives make cutting motions of principally straight line or arch form and parallel to the cutting edge. Also, circular knives for skinning have been known which make swinging movements periodically by use of direct lever contact or by use of an eccentric disc. It is also old to use a spoon-shaped single knife which makes powerful elliptical movements by use of an eccentric drive operating over a sliding block of slot form connected to a guide pin. These knives do not adequately fulfill the need, since they do not operate efficiently enough to justify their high cost. For that reason, they have not come into widespread use. These and other difficulties experienced with the prior art devices have been obviated in a novel manner by the present invention.

It is, therefore, an outstanding object of the invention to provide a power knife which is ruggedly constructed and which is provided with a power-driven cutting device of high efficiency.

Another object of this invention is the provision of a power knife providing for the use with any one of a plurality of tools, each particularly adapted to a different function.

A further object of the present invention is the provision of a power knife having means for performing a number of functions.

It is another object of the instant invention to provide a power knife which operates in such a way that the meat or other resilient substance being cut is not allowed to return to unstressed condition between cutting strokes.

With these and other objects in view, as will be apparent to those skilled in the art, the invention resides in the combination of parts set forth in the specification and covered by the claim appended hereto.

Figure 1:
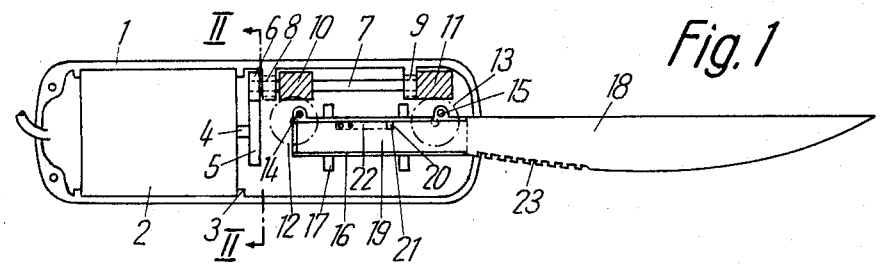
Figure 2:
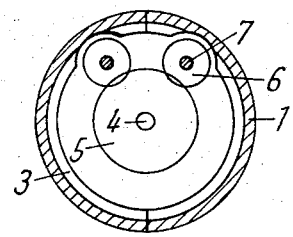
Figure 3:
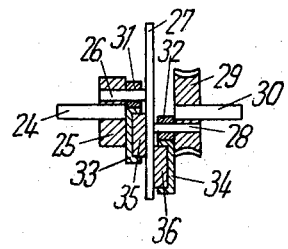
Figure 4:
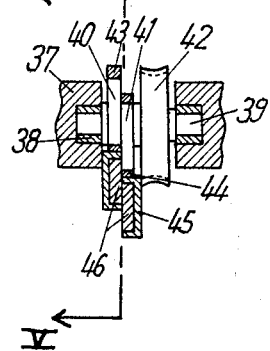
Figure 5:
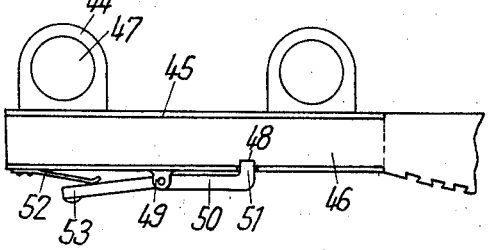

The character of the invention, however, may be best understood by reference to one of its structural forms as illustrated by the accompanying drawings in which:

FIG. 1 is a longitudinal view of a power knife embodying the principles of the present invention with portions removed for clarity of presentation, FIG. 2 is a sectional view of the invention taken on the line II—II of FIG. 1, FIG. 3 is a sectional view of drive apparatus used in the knife, FIG. 4 is a sectional view of a modified version of the drive, FIG. 5 is a sectional view of the apparatus taken along the line V—V of FIG. 4, FIG. 6 is a perspective view of a modified version of the knife, FIG. 7 is a side view of the knife shown in FIG. 6, FIG. 8 is a sectional view of the knife shown in FIG. 7 with portions broken away for clarity of understanding, FIG. 9 is a sectional view of the apparatus taken on the line IX—IX of FIG. 8, FIG. 10 shows a detail of the drive apparatus, FIG. 11 is a sectional view thereof taken on the line XI—XI of FIG. 10, FIG. 12 is a sectional view of a portion of the drive mechanism, FIG. 13 is a modified version of the apparatus shown in FIG. 10, FIG. 14 is a sectional view of another modification of the apparatus, FIGS. 15 and 16 show replaceable blades for use in the knife, FIG. 17 shows a special knife used in the apparatus, FIG. 18 is a sectional view of the last-named blade taken on the line XVIII—XVIII of FIG. 17, FIG. 19 is a blade useful in the apparatus, FIG. 20 is another blade useful in the apparatus, FIG. 21 is a sectional view of the last-named blade taken on the line XXI—XXI of FIG. 20, FIG. 22 is another form of blade useful in the apparatus, and FIG. 23 is a sectional view of the last-named blade taken on the line XXIII—XXIII of FIG. 22.

In a general way, the present invention recognizes the fact that efficient cutting of elastic meats and similar materials can be done efficiently only when the power-driven knives can be pulled along the same direction as the cutting line. Furthermore, this method is achieved effectively only when the cutting material at the spot being cut is stretched only in one direction and is not allowed to snap back between strokes. At the end of the cutting phase, the knife is not reversed directly but is lifted out of the material to be cut and, at the same time, a second knife is placed on the cutting area and pulled through in the original cutting direction. On the basis of this, the invention consists of two power-driven blades arranged in side-by-side direction and moving in counter-direction with eccentric devices engaging the cutting blades from opposite sides. The cutting blades are moved by parallel displacement and are always guided in the same direction by resting on the cutting material. It has been found advantageous to guide the eccentric discs in sleeves which also hold the blade shaft. Furthermore, the invention suggests that the stroke of a blade in the lengthwise direction be essentially longer than the lateral movement by which the knives are moved in and out of the cutting area. The moving blades are driven by eccentric discs engaging in sliding blocks having a slot formation to receive the discs.

Referring first to FIG. 1, wherein are best shown the general features of the invention, the handle 1 has half of its housing removed. In the handle is mounted an electric motor 2 maintained in place by collars 3. On the shaft 4 of the motor is mounted a gear 5 which engages a gear 6 which, in turn, is mounted on a longitudinal shaft 7 arranged inside of the handle.

In FIG. 2 is shown a sectional view of the gear drive showing the shaft 7 in place. This shaft is maintained in bearings 8 and 9 which are mounted in flanges on the inside of the handle 1. The shaft 7 carries two worm gears 10 and 11. These worm gears drive spiral gears 12 and 13 mounted in the handle. The gears 12 and 13 are provided with crankpins 14 and 15 which engage corresponding crank sleeves connected to a guide sleeve 16. The shaft 19 of a blade 18 is positioned in a U-shaped opening in the guide sleeve 16 so that the knife rests tightly with its sides on the flanges and with one flat surface on the web of the guide sleeve. The outer face of the knife shaft 19 is positioned symmetrically of the handle axis so that, after assembly of the halves of the handle, the two blades support each other. The location of the guide sleeve can be performed by the broad faces of the spiral gears 12 and 13. In the example shown, the holding of the guide sleeve 16 is performed by two abutments 17 arranged within the handle. The shaft 19 of the blade has an opening 20 in which is engaged the head 21 of a locking device. This device is biased into the opening 20 by a spring 22 mounted on the back side of the guide sleeve.

During operation, the motor 2 drives through the gears 5 and 6 and the shafts 7 located in the handle. These reciprocate the blades 18 by means of the spur gears 12 and 13 in such a way that each portion of the knife makes a local circular curve, particularly when the crankarms have the same radii. The two knives are arranged in a staggered manner at a 180° phase angle and the drive takes place in such a way that the blades are always out of parallel arrangement. By this means, it is possible to assure that the blade, during its movement, is placed against the material to be cut and pulled through the cutting area. Thereafter, one blade will be lifted from the material and, at the same time, the second blade will be placed against the material and pulled in the same cutting direction through the cut in which the first knife was pulled. The elastic cutting material, such as meat, will be pulled by this method in one direction only, so that the knife blades always attack a pre-stretched or pre-stressed material and can, therefore, work with high cutting efficiency. It should be noted that the particular blade 18 is equipped with saw teeth 23 on its lower cutting edge so that, with this blade, it is possible to cut coarse materials, such as embedded grizzle or small bones.

FIG. 3 shows a method in which the bearing shafts and the eccentric pins are formed as one piece, so that only one shaft is necessary to drive two eccentric devices. An axle shaft 24 is connected to a crank disc 25. This crank disc 25 has a crankpin 26 by which it is connected to another crank disc 27. A second crank pin 28 connected to the crank disc 27 engages a third disc 29 mounted on a bearing pin 30. This last disc is equipped with teeth and so serves as a drive wheel; in the preferred arrangement, the disc 29 is formed as a worm gear. The crank pins 26 and 28 rest in eccentric sleeves 31 and 32 and the sleeves are connected to the guide sleeves 33 and 34 which keep the knife shafts 35 and 36 in place. For the purpose of sharpening or exchanging blades, to permit the handle to be easily taken apart, or to provide a two-part eccentric device, removal of the knife blades is possible by direct engagement of the crank pins with the knife blades. This is made easy by the use of detachable holders in the guide sleeves. Such an arrangement but with interchangeable support of the eccentric device, as shown in FIG. 3, is practically necessary because the eccentric device is formed as one unit.

Referring to FIG. 4, which shows another example of the arrangement of the eccentric device in association with the two blades, eccentric discs 40 and 41 are shown as circularly-formed cams and formed as part of an axle shaft 39 made from one piece of metal. The bearing pins of the shaft 39 are embedded in bearings 38 formed from a wear-resistant material, such as sintered metal. The bearings are pressed into suitable bores formed in the housing 37. The cams 40 and 41 are surrounded by eccentric sleeves 43 and 44 which are connected with the guide sleeve 45. The shafts of the blades 46 reside in the U-shaped guide sleeves and are supported in the manner described above. One of these support areas is made resilient to provide for larger design tolerances and for compensating for wear. In a modified version of this drive arrangement, the eccentric device could have three eccentric discs and one of the discs would be formed as a crank pin and arranged in a staggered manner at an angle of 90° to the others to permit the connection of the eccentric devices one after another to one crankshaft. In this way, the gear drive and the shafts connecting the eccentric devices could be eliminated.

FIG. 5 shows the guide sleeve 45 with a knife shaft 46 inserted therein. The eccentric sleeves provide bores 47 within straps 44 connected to corresponding reinforcing portions. To lock the blade in place, an opening 48 is provided into which a catch 51 is inserted. The catch 51 is mounted on a lever 50 which is centrally supported on the guide sleeve. A spring 52 keeps the arm in locking position but it can be released by pressing a button 53 to remove the blade. The lever is mounted on an abutment 49 on the side of the guide piece and is largely isolated from lengthwise forces in the blade because the catch 51 is inserted into the blade after passing through an aperture in the guide piece 46.

The cutting procedure used in the present invention is not restricted to common eccentric guides with round eccentric pins which move the knives in a circular local curve formation. It has been found, for instance, that eccentric arrangements can be used by which the moving surface deviates from the circular form. By using differently-shaped sleeves surrounding the cams, it is possible to obtain unconventional local curve movements for the blade. It is possible, for example, to use eccentric devices which come very close to providing local curves in the shape of a square or rectangle. Such a design can be brought about by using two disc cams moving in sliding blocks of the guide pieces for the blades. The horizontal movements of the blades are controlled, which means that the movement in the lengthwise direction is similarly controlled. At the same time, the other disc cam controls the vertical movement; that is to say, the movement to the material to be cut and also away from it. The arrangement shown in FIG. 8 is an example of this based on a drive by use of such a pair of disc cams. Knife movements of this kind permit the use of a number of other tools for special cutting operations so that, in connection with the ability to exchange blades, a universal machine is created. FIGS. 6 and 7 show side and plan views of such a design. The handle halves 54 and 55 form the housing in which is mounted the drive and gear unit and they are connected by screws 64. Better handling is provided by forming the housing with indentations 56 for the four fingers, while special indentations 57 and 58 are provided for the thumb. These areas, of course, can be made in a different manner than that shown and in other positions. For instance, an indentation 59 is provided to permit holding the blade for sideways cutting or the like. Other indented areas 61 can be provided so that left-handed people may easily use the handle.

From one end of the housing extends a connector 60 adapted to be joined to a flexible drive shaft in the well-known manner. At the other end are arranged symmetrical short blades 62 and 63. FIG. 8 shows the mechanism used in the power knife shown in FIGS. 6 and 7. From the connection 60 extends a drive shaft 65 with its free end supported in the housing by means of a sleeve 66. The shaft 65 drives the shaft 69 through a worm gear 67 and a spur gear 68. On the shaft 69 and located in both sides of the housing halves are eccentric discs 72 to 75 (see FIG. 9), the larger ones being opposite one another. These eccentric discs are surrounded by the guide sleeves 76 and 77, one of which is shown in FIG. 10. The recess 81 is formed for the insertion of the blade shaft end, to better grip them, it is provided with a dovetail shape as shown in FIG. 11. In variations on this design, the recess can be made with a rectangular cross-section, similar to the recess 83 shown in FIG. 14. The blade shank may also be held within a slightly tapered recess 84 of the version shown in FIG. 13. As is shown in FIG. 12, ball-type locking devices are mounted within the recesses. As working areas for the eccentric discs, there are provided sliding blocks 78 and 79 as well as a slot 80 which extends through the half thickness of the guide sleeve. The small eccentric discs 72 which transfer the vertical movements engage the slot 80 and the two eccentric discs of the longitudinal device move within another slot. A larger eccentric disc 72, providing for the movement in the lengthwise direction, moves in a slot 78 or 79. By arranging the larger eccentric discs on the inside, it is easy to mount the guide pieces by sliding them over them. The small eccentric discs are, first of all, pushed through the recesses 78 and 79 into their working area in the recess 80. The surface pressure on the walls of the discs 72, 73, 74, and 75 and on the recesses 78, 79, and 80 can be reduced by providing circular eccentric discs in place of curved discs. A further reduction in pressure can be brought about by fitting the walls of the sliding blocks to the perimeter of the local curves. The guide pieces can be made from wear-resistant plastic.

FIG. 12 shows the two guide sleeves 76 and 77 in working position opposite to one another. Opposite the holes 82 are holes 86 in the blade shaft 85, but these are of smaller diameter so that the ball 87 fills the holes 82 and, at the same time, rests tightly in the rim of the hole 86 without going through the knife shaft 85. It resists the actual force components which come about as a result of the operation of the knife and a locking piece 70 keeps the ball in working position in its locking area. The locking piece is pivotable about a shaft 71. When the locking piece 70 has been turned 180° as shown on the left half of FIG. 12, a retracted surface 90 lies opposite the ball and permits the exit of the ball from the hole 86 but not out of the hole 82. In order to loosen one blade, it is necessary, first of all, to bring the locking piece into the open position. As shown in FIG. 6, the shaft 71 extends through the handle wall and is provided with a slot to permit unlocking of the blades with a screwdriver. A symbol is provided to show locking position. After turning the shaft 180°, the symbol is positioned to indicate the unlocked position and indicates that the loosened condition has been reached, this being that shown in the left side of FIG. 12. The corresponding blade is unlocked and can be taken from the guide piece. To make the changeover easier, the locking piece 70 is provided with a slope 91 between the faces 88 and 89 which permits any position of the guide piece, including a relatively soft insertion of the balls 87 into the locking position.

The power knife can be used not only in connection with simple knife blades like that shown in FIG. 7, but one can insert different types of tools for use in separating harder cutting materials as, for example, cartilage and bones. For instance, in accordance with FIG. 1, part of the blade near the handle is equipped with saw teeth and, in FIG. 15, a knife blade 92 is provided with a shaft 93 which is equipped with a saw tooth section 94 on its back edge. Cutting can also take place by using a wire in those situations where a wire sling is normally used by using the power knife to pull it back and forth, so that the cutting effect is more intensive. Such a tool 95 is shown in FIG. 16, this also having a shank for insertion in the drive handle and being provided with holes 96 which serve for the insertion of the ends of the wire sling (not shown). One end would be introduced from the inside of one of the tools and would be kept in place with an end fitting and the other end of the wire sling would be connected by the use of screwed fittings to the opposite blade (not shown).

In FIGS. 17 and 18 is shown a blade for the cleaning of intestines. The tool 97 is provided with a shaft 96 for insertion in the handle, the shaft 96 extending from a base 98 of the blade. The tool is operated in such a way that the tools of one pair moving in opposite directions are arranged to form a slot. On the inside of the tool are arranged longitudinally-extending flanges 99 which narrow the slot and are supported by ribs 100 which are wider as they approach the flanges. By pulling the intestines through the slot formed between the two blades, they are milled by this moving device and are correspondingly cleaned.

In order to make meat tender by jabbing or tenderizing, another tool 101 is used having a shank 102. The device is enlarged and is provided with rings having teeth 104 to resemble a comb. To assure that the tools work at a selected distance from one another, the blades are bent outwardly along a line 103. The teeth during the operation move forwardly and are moved slightly to the side which tenderizes the meat effectively.

In FIGS. 20 and 21 is shown another pair of blades for cleaning intestines. The blade 105 has a slight bend to provide a V-shaped opening 107 whose upper edge 108 is made sharp for cleaning intestines. The intestines are pulled through the slot formed by the blade which is bent at the area 106; the intestines are pulled through the slot in the direction of the arrow 110. The edges 108 scrape over the surface of the intestines. Bridging of the scraper blades by a bridge 109 prevents the entrance of the intestines into the area 108 and prevents injury to them.

In FIGS. 22 and 23 are shown blades which have proved successful for skinning. The two blades 111 are shown as being well-rounded in cross-section. Sloping notches 102 operate to provide a milling-type of separation without injuring the skin to be removed.

The power knife constructed in the manner described above provides a cutting capacity which greatly exceeds that of known cutting devices in this field. By use of the present invention, one is justified in using a power cutting device in place of hand-operated knives. This is especially true in connection with a design in which the horizontal stroke is considerably longer than the vertical stroke, in a ratio of at least two to one and, possibly, ten to one. This results in a design in which a sufficient lifting of the tool from the cutting material is achieved while, at the same time, the essential part of the driving power is used for pulling the tool through the material. The favorable cutting capacity is achieved with the minimum use of power and without vibration. By means of the features described above, the average cutting pressure remains constant and considerably less strain is felt by the operator.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A power knife, comprising
   (a) a handle,
   (b) two blades mounted in the handle with broad faces in generally parallel relationship,
   (c) power means associated with the handle for providing mechanical movement for the blades, a transmission joining the said power means to the blades to cause all points of each blade to move in the same closed path, the said transmission consisting of two cranks located at spaced positions lengthwise of each blade, each crank having a pin extending at a right angle to the broad face of the blade, the two pins moving together in the said closed path, the movement of the two blades being out of phase so that, as one blades moves in one direction out of contact with the material to be cut, the other blade moves in the other direction in contact with the material.

References Cited
UNITED STATES PATENTS

| | | | |
|---|---|---|---|
| 2,596,079 | 5/1952 | Promaska | 30—216 |
| 2,911,717 | 11/1959 | Knoll | 20—272 |
| 3,203,095 | 8/1965 | Nelson | 30—216 |
| 3,251,129 | 5/1966 | Knoll | 30—272 |

JAMES L. JONES, JR., *Primary Examiner.*